April 6, 1937.  M. C. HUTTO  2,075,849
PRESSURE GENERATOR
Filed Dec. 23, 1932

INVENTOR
Marsden C. Hutto
BY
Popp and Powers
ATTORNEYS

Patented Apr. 6, 1937

2,075,849

UNITED STATES PATENT OFFICE 2,075,849

PRESSURE GENERATOR

Marsden C. Hutto, Detroit, Mich., assignor, by direct and mesne assignments, to Pressure Generators, Inc., a corporation of Michigan Application December 23, 1932, Serial No. 648,716

15 Claims. (Cl. 122—448)

This invention relates to a generator for the production of pressure or heat, and more particularly to a steam pressure generator in which fuel and air or oxygen are admitted to a combustion chamber, ignition and expansion of the fuel taking place in this combustion chamber and flowing out in a steady non-pulsating stream through an exhaust, the heat of this exhaust and the heat generated by the combustion chamber being available for power or heating purposes through the use of water which can be vaporized in a coil through or around which the products of combustion pass.

One of the principal objects of the present invention is to provide such a pressure or heat generator which will operate at high efficiency and will provide the maximum amount of power and/or heat with a minimum consumption of fuel, and will continue to so function continuously without loss of efficiency and without deterioration of any of the parts directly connected with the combustion chamber. For this purpose the projection of any of the necessary operating elements into the combustion chamber is avoided, the points of the spark plug for starting combustion being located in a pocket well away from the heat of the combustion chamber, and the jet for the admission of fuel being located in the air passage to the combustion chamber so as to be out of contact with the intense heat of the combustion chamber and at the same time avoid any blow torch action, that is combustion within the air passage, which blow torch action results in greatly decreased efficiency.

Another object is to provide such a pressure and heat generator in which the fuel is admitted, ignited, exploded and exhausted in a continuous non-pulsating stream and in which the generator is entirely silent in its operation.

A further object is to provide such a generator which is extremely simple and of inexpensive and rugged construction, containing no internal moving parts or any other parts which are liable to get out of order or require frequent adjustment.

Another aim is to provide such a pressure generator which because of the high operating temperatures and pressures, insures the maximum fuel consumption efficiency and will not, under any conditions of operation, carbonize or produce products of incomplete combustion.

A further purpose is to provide such a generator which is entirely safe in operation since it cannot have a greater operating pressure than the inlet pressure of the air and fuel admitted to the combustion chamber.

A further aim is to also maintain a predetermined desired pressure by utilizing the pressure generated within the combustion chamber, or the pressure generated by the steam passing the combustion chamber, to control the admission of fuel and air to the combustion chamber. This control is preferably effected by a plunger which is responsive to the vapor pressure, and operates a valve controlling the exhaust from the combustion chamber in such manner that as the vapor pressure rises the exhaust is restricted, the pressure within the combustion chamber rises and thereby cuts down the amount of fuel and air admitted which is under constant pressure and therefore admitted in inverse proportion to the combustion chamber pressure.

Another purpose is to provide such a generator in which the air and fuel are both admitted under the same constant inlet pressure. This permits of readily controlling the operation of the generator, particularly where control is effected to restrict the exhaust to adjust the combustion chamber pressure, since, if different pressures were employed for introducing the fuel and air the admission of these elements would not always be in the same proportion.

A further purpose is to provide for the admission of fuel through an extremely fine orifice so that there is absolutely no danger of any back-fire through the fuel supply line even though the fuel supply fails. At the same time it is highly important that the outlet of this orifice be located away from the intense combustion chamber heat, and it is desirable that the air be mixed with the issuing stream of fuel before entering the combustion chamber so as to provide an intimate union between the air and fuel and in such manner that no blow torch action results in the passage for the mixed fuel and air to the combustion chamber.

Another object of the invention is to provide a valve in the exhaust line which opens and permits the exhaust gases to escape only when a predetermined pressure has been obtained in the combustion chamber. This is important in starting the generator since it is possible, without such a valve control, to have a series of intermittent intense explosions in the combustion chamber before the combustion chamber builds up to a pressure at which a non-pulsating, steady and silent stream of exhaust gases flows out through the exhaust pipe.

A further purpose is to provide such a generator in which the necessary operating pressures can be supplied from a single air pressure source, this air pressure being impressed upon the fuel supply so as to supply both the fuel and the air to the generator at the same pressure for facility in automatically controlling the operation of the generator. It will be understood that this air pressure can be provided through power derived from a part of the pressure developed by the generator and it will also be understood that the fuel and air can be forced into the generator by a fuel pump and a compressor or blower, suitable by-passes being provided so that these pumps and compressors always maintain the same constant outlet pressure.

A further object is to provide such a pressure generator in which any fuel which can be conveniently introduced into the combustion chamber in a finely divided form can be employed.

Another aim of the present invention is to eliminate the necessity of any water jacketing other than such chambers as are necessary to convert the water into steam.

Another purpose is to provide conveniently removable detonation points in the combustion chamber which will positively insure continuous combustion after the generator has been initially started by means of the spark plug.

Another object is to provide, in the form of the invention where the control of the operation of the generator is effected solely through an automatically controlled valve in the exhaust line, a restricted by-pass or bleeder around this valve so as to permit a very limited escape of exhaust gases. By this means, even when the exhaust valve is completely closed, the generator will be operated, with, however, an extremely small consumption of fuel and air. This bleeder therefore insures the maintenance of a high temperature and pressure in the combustion chamber at all times, particularly when no heat or pressure is being employed, and thereby renders the generator instantly available for the production of heat or pressure upon opening the exhaust valve, reducing the combustion chamber pressure, and thereby admitting increased quantities of air and fuel into the combustion chamber.

A further purpose is to provide such a pressure generator, the casing and jacketing of which consists of a small number of simple castings provided with ground joints and in which the necessary difference in expansion between the inner shells and the outer shells results in no strain upon any of the parts nor in any way affects the efficiency in operation of the generator.

Another purpose is to so admit water to the generator as to arrest the heat which otherwise would be radiated by the generator and render this heat available as power or heat. It will also be understood that an insulated jacket can be provided for further decreasing the loss of heat.

A further object is to provide such a generator in which the adjustment of the valves for the admission of the fuel and air can be fixed and in which the control of the generator can be effected exclusively through either the manual or automatic regulation of a valve in the exhaust line.

Another object is to provide, in the various modifications shown, automatic control systems which are extremely simple and reliable in operation, will not get out of order or leak, and will stand up under conditions of severe and constant use for a long period of time without getting out of order.

In the acompanying drawing.

Similar characters of reference indicate like parts in the several figures of the drawing.

Figure 1:
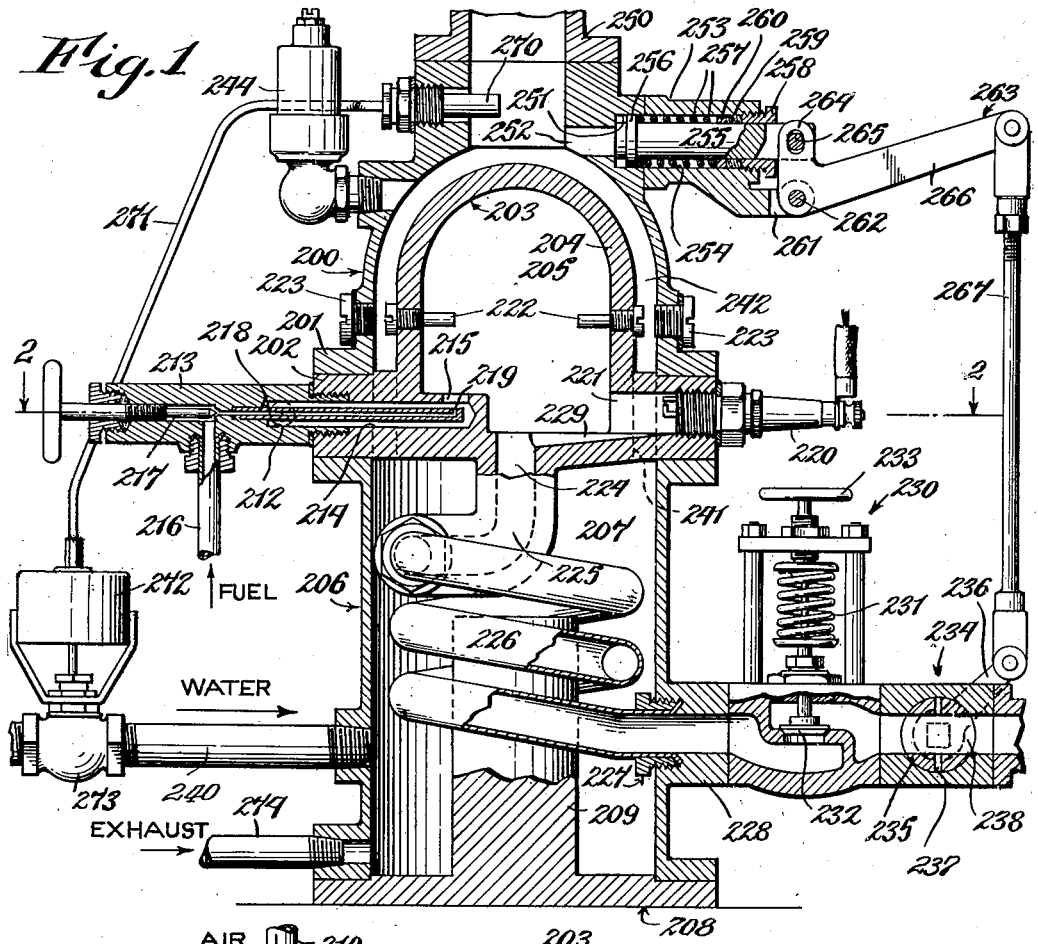
Fig. 1 is a vertical cross section of a steam pressure generator embodying my invention.
Figure 2:
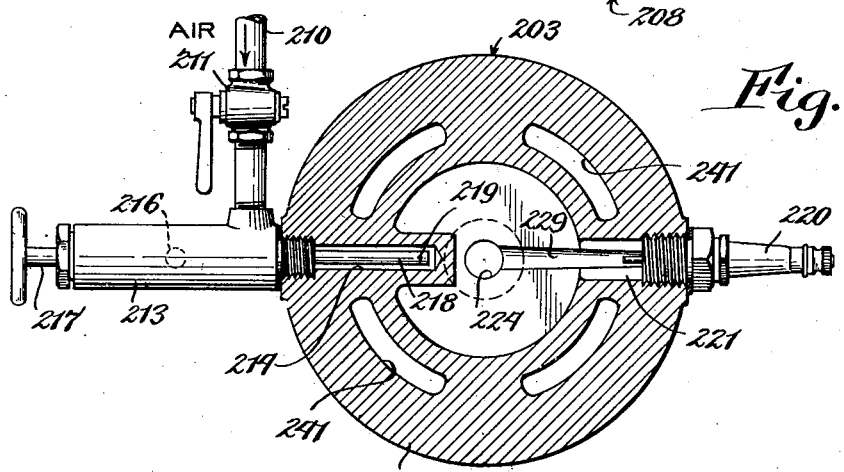
Fig. 2 is a horizontal section taken on line 2—2, Fig. 1.

The invention is adapted primarily for the production of steam. For this purpose the casing elements of the generator comprise a steam dome 200, the flanged base 201 of which is secured to the base 202 of a casting 203 which is formed with an inner shell 204 enclosing the combustion chamber 205. The base portion 202 of the casting 203 encloses the bottom of the combustion chamber and this base is secured to the upper flange of a casting 206 which forms a boiler chamber 207. The bottom flange of the casting 206 is secured to a base casting 208 which is formed to provide an upwardly projecting extension 209, this extension 209 reducing the volume of the boiler chamber 207. Air under pressure is introduced from an air line 210 and past an adjustment valve 211 into a passage 212 in a fitting 213, this fitting 213 being screwed into the base portion 202 of the casting 203. From the passage 212 the air is forced into a horizontal passage 214 in the base portion 202 of the casting 203 and it is discharged outwardly through a vertical port 215 into the combustion chamber 205.

The fuel is admitted under the same pressure as the air from a fuel supply pipe 216. The fuel passes an adjustable needle valve 217 in the fitting 213 and continues its passage through a drilled tube 218. The discharge orifice 219 of this drilled tube projects the fuel into the air stream emerging from the port 215 in such manner that combustion takes place within the combustion chamber 205 and not in the orifice 219. It will be understood that the proper proportions of air and fuel can be permanently adjusted by regulation of the air valve 211 and the fuel needle valve 217.

The initial combustion of the fuel mixture in the combustion chamber in starting is effected by a spark plug 220 which is screwed into an opening 221 in the base portion 202 of the casting 203. The points of the spark plug are disposed well away from the combustion chamber in the pocket formed by the opening 212. After the generator has started, continued combustion is assured by a pair of detonation points 222 which are screwed into the inner shell 204 of the casting 203 from the outside, suitable plugs 223 being provided to permit of the ready removal and replacement of the detonation points.

The products of combustion from the combustion chamber 205 pass out through a passage 224 in a depending curved neck 225 which is formed integrally with the casting 203 and extends downwardly into the boiler chamber 207. To the lower outlet end of the curved neck 225 is secured, in any suitable manner, the upper end of a coil 226 which is immersed in the water in the boiler chamber 207 and has its lower outlet end suitably connected, as indicated at 227 to the exhaust nipple 228 formed in the casting 206 of the generator. It will be understood that the pressure of the exhaust combustion gases from the valve 234 can be utilized for power purposes, particularly for running a compressor or blower (not shown) for supplying the compressed air which is employed for feeding air and fuel to the generator, or to also operate a fuel pump and water pump.

In order that the spark plug 220 be prevented at all times from becoming wet from the fuel, a drain channel 229 is provided in the bottom of the combustion chamber 205 which drains away from the spark plug and into the passage 224.

A minimum pressure within the combustion chamber 205 is maintained at all times by a spring valve indicated generally at 230. This valve has a spring 231 which urges the valve head 232 into its closed position, the tension of this spring being adjusted by an adjustment wheel 233. By this means, particularly during starting, the products of combustion cannot escape until the pressure within the combustion chamber has built up to a predetermined point, thereby avoiding intermittent explosions in starting.

After passing the pressure maintaining valve 230 the products of combustion pass through a plug valve 234 having a rotating plug 235 with a transverse port 238, the plug 235 being turned by an external arm 236. The plug 235 can also be provided with bleeder passages 237 so that the generator will operate with a very small consumption of fuel even when the valve 234 is completely closed, thereby rendering the generator instantly available for the production of steam pressure when desired.

Water to the boiler chamber 207 is introduced under pressure through a pipe 240 which maintains a level in the boiler chamber 207 just submerging the coil 226. The hot exhaust gas passing through this coil heats this water and generates steam, this steam, under pressure, passing up through ports 241 in the base portion 202 of the casting 203 and through the space 242 between the steam dome 200 and the inner shell 204 forming the combustion chamber. In so passing around the combustion chamber shell this steam is superheated and expanded and passes out through the steam outlet 243 at the upper end of the steam dome 202 from which it can be piped to radiators for heating or to a steam engine or turbine for power. A suitable safety valve 244 is provided in the steam dome to prevent excessive steam pressures.

Automatic control means are provided for maintaining a predetermined steam pressure. For this purpose the steam dome 200 is formed to provide a boss 250 provided with a horizontal bore 251, this bore being connected by a port 252 with the steam outlet passage 243. A cylinder 253 is connected to the boss 250 and has a bore 254 registering with the bore 251 in the boss. A plunger 255 having an enlarged inner piston head 256 works in the bores 251 and 254 and is urged inwardly by a helical compression spring 257. The tension of this spring is adjusted by a gland nut 258 in the cylinder 253 and the spring 257 is also utilized to impress a yielding pressure upon the packing 259 of this gland, a metal washer 260 being interposed between the spring 257 and the packing for this purpose.

The cylinder 253 is formed to provide a pair of ears 261 which carry a pivot pin 262, a bell crank 263 being mounted on this pivot pin. The short arm 264 of this bell crank lever extends upwardly and has a slot connection with a pin 265 on the rear end of the plunger 255. The long arm 266 of the bell crank lever 263 is connected by a rod 267 with the operating arm 236 of the control valve 234. This rod is preferably adjustable as to length to permit of the adjustment of this automatic control.

Automatic control means are also provided for maintaining a predetermined temperature of the steam generated in the generator. For this purpose a thermostat 270 is placed in the steam outlet neck 243 of the generator and the outlet or control line 271 of this thermostat actuates a regulator 272 which controls a valve 273, this valve controlling the admission of water through the pipe 240 to the generator. This control is so organized that as the temperature of the steam generated rises above a predetermined setting of the regulator 272, this regulator will open the valve 273 and admit more water, thereby cooling the steam generated by the generator.

It is apparent that the regulation of the generator in response to both the pressure and the temperature provide a complete control of the generator output. Thus, with too high a temperature of the steam issuing from the generator the thermostat 270, through the regulator 272, will increase the amount of water thereby cutting down the heat of the steam generated by increasing its pressure. This increase in pressure will, however, move the plunger 255 to shut down the valve 234 thereby reducing the amount of fuel and air admitted to the combustion chamber and reducing the heat generated by the generator.

The operation of the form of the invention is as follows:

The fuel and air are admitted under the same constant pressure through the fuel and air inlet pipes 216 and 210. The relative amounts of the fuel and air are permanently adjusted through the adjustment of the air valve 211 and the needle valve 217. The air enters through the passages 212 and 214 and passes through the port 215 into the combustion chamber 205. The fuel is discharged through the orifice 219 in the rod 218, the orifice 219 being so placed that combustion takes place in the combustion chamber 205 and not in the port 215. The admission of fuel and air is continued until a pressure is built up to the point at which the pressure valve 230 would open and the mixture is ignited by passing high tension current through the spark plug 220. Thereafter the current through the spark plug is cut off and the continuous ignition of the gases continues automatically. The burning gases pass through the curved neck 225 and through the coil 226. As the pressure of these gases builds up, the pressure valve 230 is opened and the gases pass through the valve 234.

Water, admitted through the pipe 240, fills the boiler 207 up to the top of the coils 226. This water is therefore heated by the hot exhaust gases passing through the coils and is generated into steam which passes through the ports 241 into the space 242 surrounding the combustion chamber shell 204. This steam is superheated and serves to prevent overheating of the combustion chamber. The steam so generated passes out through the outlet 243 at the top of the steam dome and is used for power or heating purposes.

As the steam pressure rises above that which the generator is set to maintain, the steam pressure in the outlet 243 moves the piston 255 outwardly thereby forcing the long arm 266 of the bell crank lever 263 downwardly. This swings the arm 236 of the valve 234 downwardly and restricts the exhaust of the products of combustion from the generator. This restriction of the exhaust increases the pressure in the combustion chamber 205 and as this pressure is increased the supply of fuel and air to the combustion chamber is automatically cut down because this fuel and air is supplied at a constant pressure. Should additional steam then be required, the withdrawal of this steam reduces the steam pressure in the outlet 243 and the spring 257 moves the plunger 225 inwardly. This opens the valve 230, immediately reducing the pressure in the combustion chamber and increasing the quantities of fuel and air which are admitted to the combustion chamber, thereby providing increased heat output and immediately generating and superheating steam to build the steam pressure up to the desired pressure.

As the temperature of the steam generated by the generator rises above the setting of the regulator 272, the thermostat 270 will operate this regulator 272 to open the valve 273 and increase the amount of water admitted to the generator through the pipe 270. This will cause more steam to be generated at lower temperatures and bring the temperature of the steam generated back to that which was desired to be maintained. At the same time, a greater pressure of the steam will occur and this pressure will operate the plunger 255 to close the valve 234 and thereby increase the pressure in the combustion chamber. This increased pressure in the combustion chamber results in a decreased amount of fuel and air supplied to the generator and consequently the energy output of the generator will be reduced. It is therefore apparent that the temperature and pressure control of the combustion will operate to maintain any desired pressure and temperature of the steam generated and thereby makes the generator responsive to variations in the power or heat load which is imposed upon it.

From the foregoing it is apparent that the present invention provides a pressure or heat generator which is highly efficient, extremely simple and compact in construction, consists of few parts which are not liable to get out of order and which are automatic in their operation so as to avoid the necessity of constantly adjusting the generator as the output requirements vary. It is also apparent that the present invention provides a unit which is capable of a wide range of uses and accomplishes all of the objects set forth. The present invention is capable of wide variation in construction and the invention is therefore not to be construed as specifically limited to the form shown or described but is to be accorded the full range of equivalents comprehended by the accompanying claims.

I claim as my invention:

1. A heat generator of the character described, comprising a casing having a central portion, a shell projecting outwardly from one side of said central portion and forming a combustion chamber, a dome attached to said central portion and forming a jacket around said combustion chamber, means forming a boiler chamber at the opposite side of said central portion from said combustion chamber, said boiler chamber being in communication with the space between said shell and dome and said space having an outlet, means for exhausting the combustion chamber through a conduit extending through said central portion and boiler, means for admitting fuel and oxygen through said central portion to said combustion chamber and means for igniting said admitted fuel.

2. A heat generator of the character described, comprising a casing composed of a casting having a central portion and a shell projecting outwardly from one side thereof said shell comprising a combustion chamber, another casting which is dome-shaped and has its rim secured to said central portion and forms a jacket around said combustion chamber, means forming a boiler chamber at the opposite side of said central portion from said combustion chamber, said central portion being provided with a passage connecting said boiler and the space between said dome and shell and said space having an outlet, means for exhausting the combustion chamber through a conduit extending through said central portion and boiler, means for admitting fuel and oxygen through said central portion to said combustion chamber and means for igniting said admitted fuel.

3. A steam pressure generator of the character described, comprising a casing having a central portion, a shell projecting outwardly from one side of said central portion and forming a combustion chamber, a dome attached to said central portion and forming a jacket around said combustion chamber, means forming a boiler chamber at the opposite side of said central portion from said combustion chamber, said boiler chamber being in communication with the space between said shell and dome and said space having a steam outlet, means for exhausting the combustion chamber through a conduit extending through said central portion and boiler, means for admitting fuel and oxygen through said central portion to said combustion chamber, means for igniting said admitted fuel and means carried by said dome and responsive to the steam pressure therein for varying the quantities of fuel and oxygen admitted.

4. A heat generator of the character described, comprising a shell having a base portion and forming a combustion chamber having an exhaust port through said base portion, a dome secured to said base portion and jacketing said shell, means for admitting fuel and air through said base portion to said combustion chamber, means for admitting water to said jacket, said jacket also having an outlet, a detonation point screwed into said shell from the outside thereof and projecting into said combustion chamber and means permitting access to said detonation point comprising a screw plug in said dome opposite said detonation point.

5. A heat generator of the character described, comprising means forming a combustion chamber having an exhaust, means for admitting fuel and oxygen in a continuous stream to said combustion chamber, means for igniting the continuously admitted fuel, means for controlling the admission of fuel and oxygen comprising a valve adjustably regulating the continuous escape of said exhaust and maintaining the desired continuing operating pressure within the combustion chamber, means providing a restricted bleeder for said combustion chamber thereby to insure continued operation of the generator when said valve is completely closed and means for absorbing the heat of the products of combustion.

6. A heat generator of the character described, comprising means forming a combustion chamber having an exhaust, means for admitting fuel and oxygen to said combustion chamber, means for igniting the admitted fuel, and means for controlling the admission of fuel and oxygen comprising a valve controlling the escape of said exhaust, means actuated through variations in the steam output of the generator for actuating said valve and means for absorbing the heat of the products of combustion.

7. A steam pressure generator of the character described, comprising means forming a jacketed combustion chamber and exhaust, means for admitting fuel and oxygen to said combustion chamber, means for igniting the admitted fuel, means for admitting water to said jacket and relieving the steam therefrom and means for controlling the admission of fuel and oxygen comprising a valve controlling the escape of said exhaust and means responsive to the pressure of the steam in said jacket for regulating said valve.

8. A steam pressure generator of the character described, comprising means forming a completely enclosed combustion chamber having an exhaust, means for admitting fuel and oxygen to said combustion chamber, means for igniting the admitted fuel, a jacket for said combustion chamber and exhaust having a power outlet, means for admitting water to said jacket and relieving the steam therefrom, and means for controlling the admission of fuel and oxygen to said combustion chamber, comprising a valve controlling the escape of said exhaust and means responsive to the steam pressure in said jacket for regulating said valve.

9. A pressure generator of the character described, comprising a casting having a base portion and an imperforate shell formed on the upper side of said base portion and forming a combustion chamber, means for admitting fuel and oxygen through said base portion into said combustion chamber, means for igniting said admitted fuel, a dome secured to said base portion and jacketing said shell, a boiler chamber arranged below and secured to said base portion, said base portion being formed to provide a depending neck arranged in said boiler chamber and through which the exhaust from said combustion chamber passes, a coil secured to said neck and conducting the exhaust gases through the wall of said boiler chamber and means for admitting water to said boiler chamber, said base portion being provided with an opening permitting of the escape of steam from said boiler chamber through said jacket.

10. A pressure generator of the character described, comprising means forming a completely enclosed combustion chamber having an exhaust, means for admitting fuel and oxygen to said combustion chamber, means for igniting the admitted fuel, a jacket for said combustion chamber having a power outlet, means for admitting water to said jacket, means for controlling the admission of fuel and oxygen to said combustion chamber, comprising a valve controlling the escape of said exhaust, means responsive to the steam pressure in said jacket for regulating said valve, and thermostatic means responsive to the temperature of the steam generated in said jacket for controlling the admission of said water to said jacket.

11. A heat generator of the character described, comprising means forming a combustion chamber having an exhaust line, means for admitting fuel and oxygen in a continuous stream to said combustion chamber, means for igniting the continuously admitted fuel, means for controlling the admission of fuel and oxygen comprising a positive valve in said exhaust line having an orifice, a head for adjusting the size of said orifice and means for positively moving said head to adjust the size of said orifice and means for heating a fluid from the heat of the products of combustion.

12. A heat generator of the character described, comprising means forming a combustion chamber having an exhaust line, means for admitting fuel and oxygen under pressure in a continuous stream to said combustion chamber, means for igniting the continuously admitted fuel, means for controlling the admission of fuel and oxygen comprising a positive valve in said exhaust line having an orifice, a head for adjusting the size of said orifice and means for positively moving said head to adjust the size of said orifice and means for heating a fluid from the heat of the products of combustion.

13. A steam pressure generator of the character described, comprising a combustion chamber having an exhaust, means for admitting fuel and oxygen to said combustion chamber, a common valve for controlling the admission of both fuel and oxygen through said last means, means igniting said admitted fuel, means for generating steam through heat derived from the combustion of said fuel and mechanical means arranged externally of said combustion chamber and actuated by the pressure of said steam for controlling said common fuel and oxygen valve to vary the amount of fuel and also the amount of oxygen admitted in inverse ratio to said pressure.

14. A steam pressure generator of the character described, comprising a jacketed combustion chamber having an exhaust, means for admitting fuel and oxygen both under pressure to said combustion chamber, a common valve for controlling the admission of both the fuel and oxygen through said last means, means igniting said admitted fuel, means for admitting water into said jacket, a steam outlet from said jacket for power purposes, and means mounted in the outer wall of said jacket and actuated in response to the pressure of the steam in said jacket for controlling said common fuel and oxygen valve to vary the amount of fuel and also the amount of oxygen so admitted in inverse ratio to said pressure.

15. A heat generator of the character described, comprising means forming a combustion chamber having a sinuous exhaust line, means for admitting liquid fuel and air in a continuous stream to said combustion chamber, means for igniting the continuously admitted fuel, means for controlling the admission of fuel and air comprising a positive valve adjacent the outlet end of said exhaust line and having an orifice through which the exhaust gases pass, a plug for adjusting the size of said orifice and means arranged externally of said exhaust line for positively moving said plug to adjust the size of said orifice and means for passing a fluid to be heated around the exterior of said sinuous exhaust line.

MARSDEN C. HUTTO.